United States Patent [19]

Stauffer

[11] Patent Number: 4,546,844
[45] Date of Patent: Oct. 15, 1985

[54] FRONT WHEEL ASSIST DRIVE FOR A VEHICLE MACHINE

[75] Inventor: Robert E. Stauffer, Bucyrus, Ohio

[73] Assignee: Dresser Industries, Inc., Dallas, Tex.

[21] Appl. No.: 471,586

[22] Filed: Mar. 3, 1985

[51] Int. Cl.$^4$ .......................... B60K 7/00; F16H 1/28; F16H 47/00; F16D 21/08
[52] U.S. Cl. .................. 180/243; 180/308; 74/730; 74/801; 74/421 A; 74/655; 192/48.92; 192/50; 192/4 R
[58] Field of Search ................ 180/242, 308, 243; 74/730, 801, 785, 421 A, 655; 192/48.92, 49, 50, 4 R

[56] References Cited

U.S. PATENT DOCUMENTS

| | | | |
|---|---|---|---|
| 2,085,606 | 6/1937 | Rockwell et al. | 192/48 |
| 2,688,256 | 9/1954 | Forster | 74/336.5 |
| 2,864,265 | 12/1958 | Fell | 74/675 |
| 3,191,732 | 6/1965 | McDowall | 192/48 |
| 3,319,745 | 5/1967 | Hilpert | 192/3.5 |
| 3,465,610 | 9/1967 | Michelson | 74/368 |
| 3,485,005 | 7/1969 | Malm et al. | 180/243 |
| 3,552,516 | 1/1971 | Beard et al. | 180/243 |
| 3,618,719 | 11/1971 | Marland | 192/4 R |
| 3,736,732 | 6/1973 | Jennings et al. | 180/308 X |
| 3,804,190 | 4/1974 | Shaffer | 180/243 X |
| 3,827,528 | 8/1974 | Shaffer | 180/243 |
| 3,865,207 | 6/1973 | Schwab et al. | 180/242 X |
| 3,918,546 | 11/1975 | Chichester et al. | 180/243 |
| 3,981,374 | 9/1976 | Johns, Jr. | 180/242 X |
| 4,099,588 | 9/1976 | Dezelan | 180/242 |
| 4,102,425 | 7/1978 | Marsden et al. | 180/242 |
| 4,105,085 | 11/1976 | Van Der Lely | 180/242 X |
| 4,140,194 | 3/1977 | Moreau | 180/242 X |
| 4,140,196 | 2/1979 | Brewer | 180/242 |
| 4,401,182 | 8/1983 | Pollman | 180/242 |
| 4,444,286 | 4/1984 | Hawkins et al. | 180/243 X |

FOREIGN PATENT DOCUMENTS

| | | | |
|---|---|---|---|
| 1911368 | 2/1973 | Fed. Rep. of Germany | 180/243 |
| 2350038 | 5/1974 | Fed. Rep. of Germany | 180/243 |

OTHER PUBLICATIONS

One-Way Clutch Design Guide Types, Selection, Applications, Borg Warner (1970).

Primary Examiner—Leslie A. Braun
Assistant Examiner—Stephen B. Andrews
Attorney, Agent, or Firm—Barry E. Deutsch

[57] ABSTRACT

A front wheel assist drive for a vehicle having a rear wheel main drive includes a hydraulic fluid pump. The pump is connected to a hydraulic motor. The motor is connected to an output shaft. An overrunning clutch is interposed between the motor and output shaft for selectively connecting the shaft to the motor when the motor is turning in a first direction. An output shaft is connected to a front wheel for driving the wheel in a first direction via the motor. A control is connected to the motor for preventing the motor from dynamically braking the vehicle when the wheel is driven in a reverse direction through the main drive.

14 Claims, 4 Drawing Figures

FRONT WHEEL ASSIST DRIVE FOR A VEHICLE MACHINE

BACKGROUND OF THE INVENTION

This invention relates to a drive system for a vehicle, and in particular to an auxiliary drive system for driving the normally non-powered front wheels thereof.

Vehicles, are typically driven by applying power to the rear wheels thereof. It has been found that productivity of the vehicle can be increased by selectively applying an auxiliary drive system to the normally non-powered front wheels. The application of power to the front wheels is particularly effective where the tractive conditions are poor or too variable, as when operating in snow, mud, sand or ice. Although, sometimes such adverse conditions exist for only short periods of time, adequate traction is needed to maintain the vehicle's productivity at a reasonable level and to prevent the vehicle from becoming stuck.

When the vehicle is a construction machine such as a motor grader, powering the front wheels has the additional benefit of helping to counteract the side force resulting from angling the mold board during grading operations. Although wheel lean and additional front axle weight help, front wheel drive increases productivity in such cases.

A number of physical characteristics effect the application of a front wheel drive to a vehicle, such as a construction machine, particularly when the machine is a motor grader or similar type of apparatus. For example, the motor grader has a long wheel base and generally has the blade and its support mechanism located between the rear wheel drive axle and the front axle. The machine also has high steering angles and the front wheels must be capable of leaning for various applications.

The utilization of a hydrostatic drive as the front wheel assist drive resolves many of the problems discussed above. However, the utilization of a hydrostatic drive also generates other problems, as for example, conventional hydrostatic systems inherently yield dynamic braking which may be an undesirable characteristic. Further, the synchronization of the speed of a hydrostatic drive to a gear or power shift drive normally used to power the rear wheels is difficult.

SUMMARY OF THE INVENTION

It is an object of this invention to provide a front wheel assist drive for a motor grader.

It is an object of this invention to utilize a hydrostatic drive to selectively deliver power to the front wheels of a construction machine without generating dynamic braking.

It is a further object of this invention to effectively synchronize the speeds of the front wheel assist drive to the rear wheel drive system.

It is yet another object of this invention to selectively power the front wheels of a construction machine normally driven through providing power to the machine's rear wheels.

These and other objects of the present invention are attained in a front wheel assist drive for a vehicle having a rear wheel main drive and including a hydraulic fluid pump. The pump is connected to a hydraulic motor. The motor is connected to an output shaft. An overrunning clutch is interposed between the motor and output shaft for selectively connecting the shaft to the motor when the motor is turning in a first direction. The output shaft is connected to a front wheel for driving the wheel in a first direction via the motor. A control is connected to the motor for preventing the motor from dynamically braking the construction machine when the wheel is driven in a reverse direction through the main drive.

DESCRIPTION OF THE PREFERRED EMBODIMENT

Figure 1:
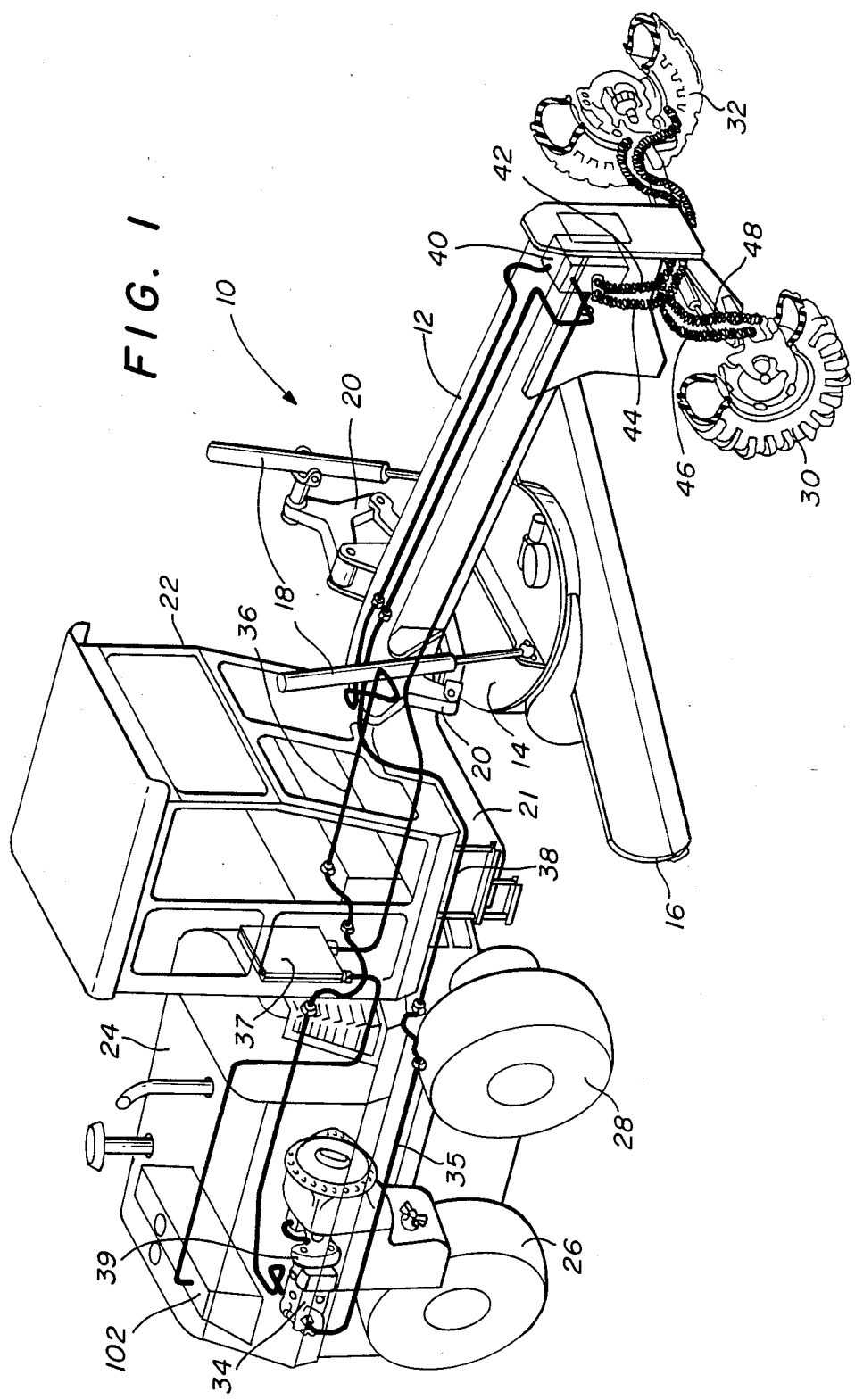
FIG. 1 is a perspective view of a vehicle embodying the present invention, with portions of the vehicle being broken away for purposes of clarity.

Referring now to the various Figures of the drawing, there is disclosed a preferred embodiment of the present invention. In referring to the various Figures, like numerals shall refer to like parts.

Referring specifically to FIG. 1, there is disclosed a vehicle, such as a construction machine including the front wheel assist drive of the present invention. In particular, the construction machine is illustrated as a motor grader 10. While a motor grader is illustrated as embodying the present invention, it should be understood that other types of multi-wheel vehicles may also utilize the front wheel assist drive of the present invention.

Grader 10 includes a main front frame member 12 having a linkage member 20 connected thereto. Hydraulic cylinders 18 are connected to linkage 20 and are operable to control the position of mold board 14. Mold board 14 is utilized to control the position of blade 16 connected thereto.

An operator's compartment 22 is situated longitudinally to the rear of mold board 14 and blade 16. Compartment 22 is affixed to platform member 21 which is connected, as by welding, to frame member 12. Platform member 21 is supported by tires 26 and 28 attached to their respective wheels for movement along the underlying ground; front tires 30 and 32 likewise support frame member 12.

Engine housing 24 is located on platform 21 immediately aft cab 22. Housing 24 houses the main grader engine (not shown) and various components of the grader transmission system. Such components include transmission 35, pump 34, hydraulic oil reservoir or sump 102, and hydraulic oil cooler 37. Pump 34 circulates oil used in the hydrostatic transmission system employed with the front wheel assist drive of the present invention. The pump is connected to transmission 35 through transfer case 39 so that the output of the pump matches the output of the main drive engine.

When the grader is moving forward, conduit 36 delivers oil from pump 34 and conduit 38 returns the oil to the inlet of the pump. When the grader is backing up, the inlet and outlet of the pump are reversed together with the function of conduits 36 and 38. Conduit 36 delivers oil to a flow divider 40. Flow divider 40 is utilized in the control system schematically illustrated in FIG. 4. Suffice to say at the present, flow divider 40 evenly distributes the oil to two parallel circuits comprising conduits 42 and 46. Conduits 42 and 46 deliver the oil to motors 50 (see FIG. 2) used to independently drive the front wheels when front wheel assist drive is required. Conduits 44 and 48 provide parallel return circuits from motors 50. Conduits 44 and 48 communicate with conduit 38.

Figure 2:
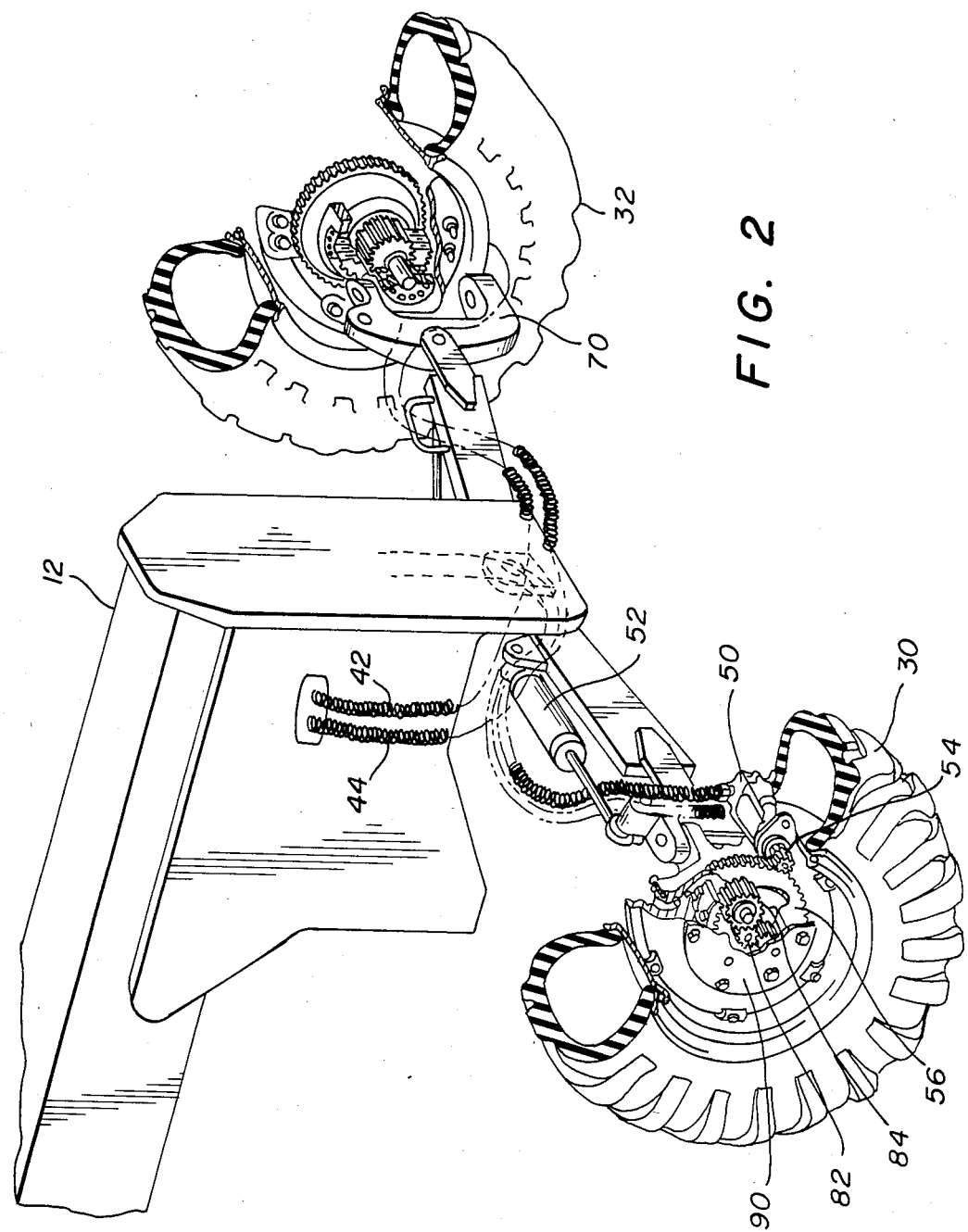
FIG. 2 is an enlarged perspective view of the front end of the vehicle illustrated in FIG. 1 further illustrating the present invention.
Figure 3:
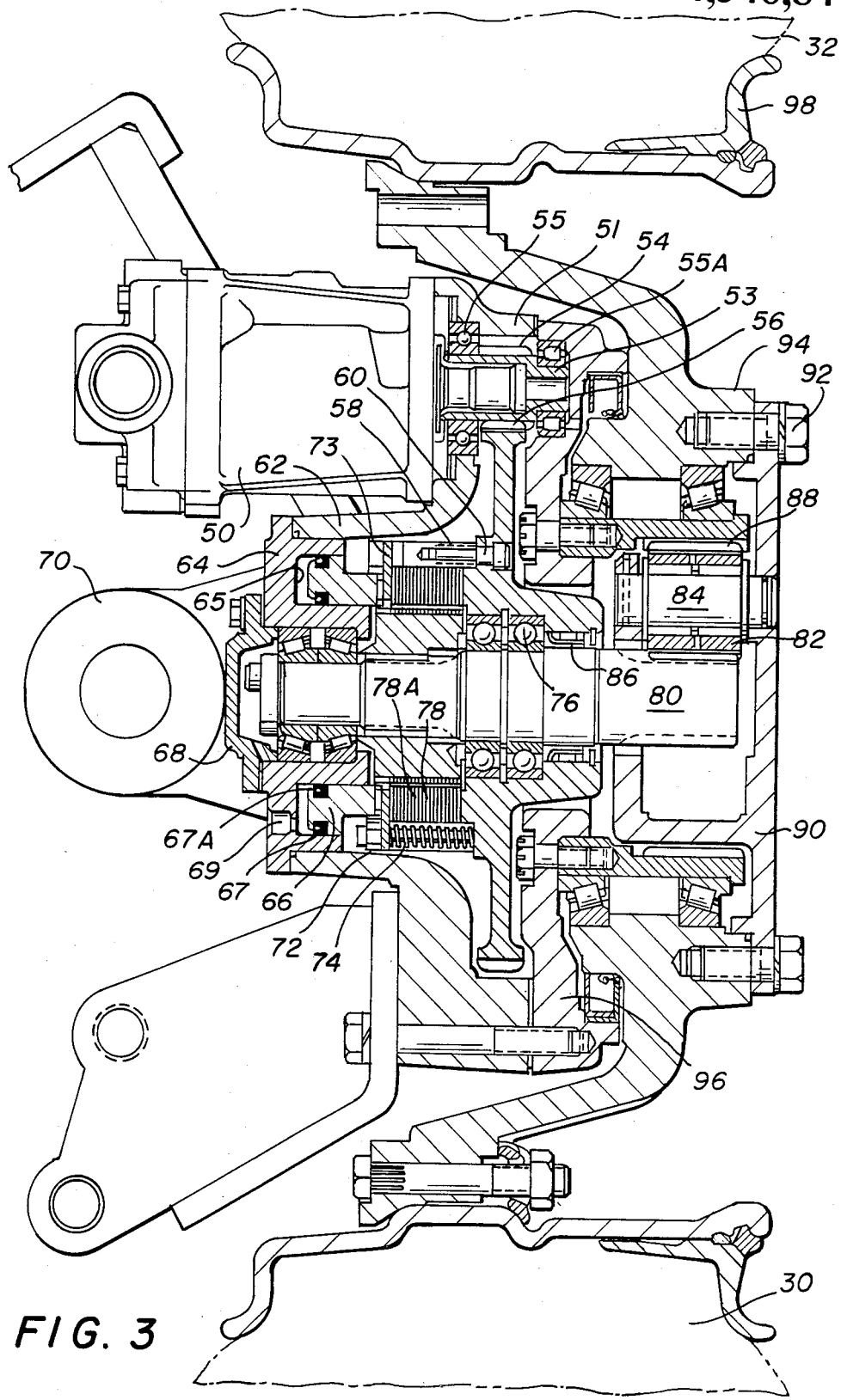
FIG. 3 is a horizontal sectional view through one of the front wheels illustrated in FIGS. 1 and 2.

Referring now to FIGS. 2 and 3, there is disclosed further details of the front wheel assist drive system of the present invention. Motor 50 is an hydraulically operated motor and is mounted to housing 51. Motor 50 includes an output shaft 53. A gear 54 is operatively connected to shaft 53 and in turn drives main or bull gear 56. Bearings 55 and 55A journal shaft 53. Bolt 60 or a similar connecting device joins bull gear 56 to a rotatable housing member 58. A stationary housing member 62 is disposed radially about housing member 58. A second stationary housing member 64 is connected to the end of housing member 62 and defines a piston chamber 65. Piston 66, having piston rings 67 and 67A, is movably disposed within chamber 65. A connecting member 69 forms an orifice in housing member 64 to permit oil flow to and from piston chamber 65. The assembly further includes bearing cap 68.

Bull gear 56 is selectively connected to output shaft 80 through one-way or overriding clutch 86 when motor 50 is rotating in a first direction and through a hydraulically actuated friction clutch 72 when the motor is rotating in a reverse direction. Overriding clutch 86 may be of a type sold by BORG-WARNER, part number 140572. Clutch 72 includes pressure plates 78 and separator plates 78A and thrust plate 73. The clutch further includes return spring 74. In operation, flow of oil through oil connecting member 69 into chamber 65 moves piston 66 to the right as viewed in FIG. 3, thereby engaging clutch 72. When it is desired to disengage the clutch, the flow of oil through connecting member 69 is discontinued whereby return spring 74 provides a force to move piston 66 to the left as viewed in FIG. 3, thereby forcing the oil within chamber 65 outward through member 69. Suitable bearings 76 rotatably journal the bull gear about output shaft 80. Output shaft 80 terminates in sun gear 82. Planetary gears 84 rotate about sun gear 82. The planetary gears rotate within internally toothed stationary ring gear 88.

Planetary gears 84 are connected to a rotatable member 90 which, inturn, is connected to wheel 94 through appropriate connecting means such as bolts 92. The gear drive assembly is housed within housing 96 and wheel 94. Tire 30 is secured to wheel 94 through means 98. The operation of the components of the front wheel assist drive described hereinabove shall be more fully explained hereinafter.

Figure 4:
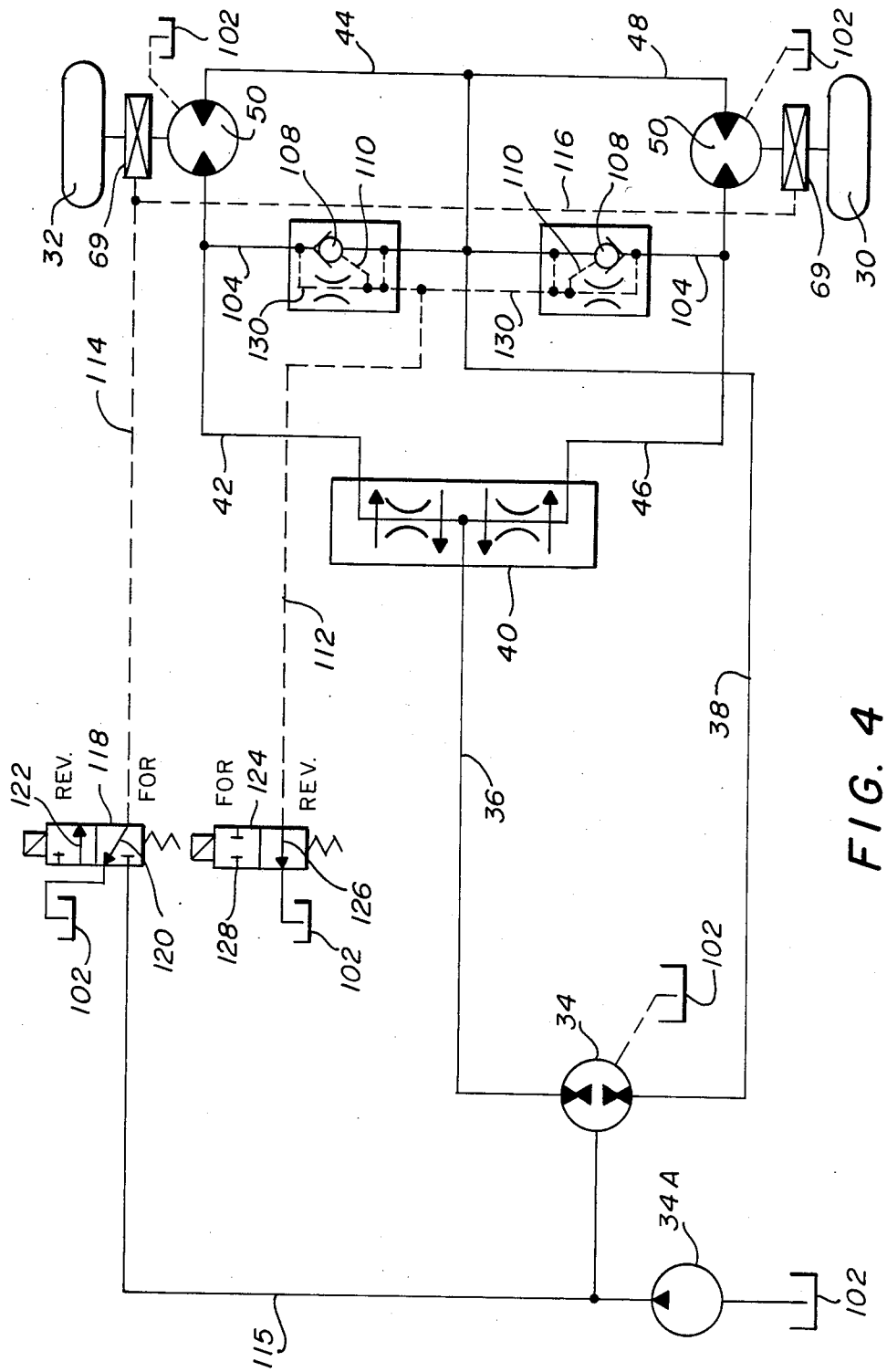
FIG. 4 is a schematic diagram illustrating a control system suitable for use with the drive system of the present invention.

Referring now to FIG. 4, there is disclosed a preferred embodiment of a control system suitable for use in the front wheel assist drive of the present invention. The control system utilizes a fluid, such as hydraulic oil pumped from sump 102 by pump 34 through conduit 36 when the grader is moving in a first direction. The fluid is delivered through flow divider means 40, which operates to divide the flow of oil into two equal portions to simultaneously pass through parallel circuits defined by conduits 42 and 46. Conduits 42 and 46 deliver the fluid to a pair of motors 50, with one of the motors being utilized to drive the wheel mounting tire 30 and the other of said motors being used to drive the wheel mounting tire 32. Parallel return conduits 44 and 48 are respectively connected to one of the motor's outlets, and in turn connect with conduit 38 which returns the fluid to the inlet of pump 34.

A pair of conduits 104 are connected to conduits 42 and 46 and provide an additional flow path for a reason to be more fully described hereinafter. Each conduit 104 has a check valve 108 disposed therein. A further conduit 130 is connected to conduit 104 to provide a bypass flow path about check valve 108. Conduit 110 is connected to conduit 130 to provide flow to the downstream side of check valve 108. Conduit 112 is connected to conduits 130 and delivers fluid therefrom to control valve 124. Control valve 124 includes an open line 126 and a closed line 128. As shall be more fully described hereinafter, closed line 128 is in communication with conduit 112 when the construction vehicle is moving in a forward direction; whereas opened line 126 is in communication with conduit 112 (as shown) when the construction vehicle is moving in a reverse direction.

Conduit 115 is connected to the output of charge pump 34A. Conduit 115 permits passage of hydraulic fluid from pump 34A to valve 118 for a reason to be more fully explained hereinafter. Valve 118 includes internal lines 120 and 122. Line 122 communicates conduits 115 and 114 when the construction vehicle is moving in a reverse direction. Line 120 communicates conduit 114 to sump 102 when the vehicle is moving in a forward direction.

OPERATION

Initially, let us assume vehicle 10 is moving in a forward direction through operation of the normal rear wheel drive system. Front wheels 30 and 32 turn as driven by the motion of the vehicle. Although fluid is pumped via pump 34 through conduit 36, flow divider 40 and conduits 42 and 46 to each hydraulic motor 50, the front wheels will not be affected by the operation of the motors during normal or standard operation, as when the vehicle is traveling at highway speed. As noted previously, motor 50 drives main gear 56 which, in turn, drives output shaft 80. One-way clutch 86 selectively connects the main gear to the output shaft. So long as the rotational speed of the front wheels 30 and 32, as driven by the forward motion of the vehicle, is greater than the rotational speed of motor 50, one-way clutch 86 effectively isolates output shaft 80 from main gear 56. Thus, operation of motor 50 will not interfere with the operation of the normal, rear wheel drive system of the vehicle.

However, when motor 50 is attempting to rotate at a speed greater than the rotational speed of wheels 30 and 32, the rotational speed of main gear 56 likewise matches the rotational speed of shaft 80. Under such conditions, one-way clutch operates to unite the output shaft 80 to the main gear 56 whereby the output shaft will be driven by motor 50. With reference to FIG. 4, it will be observed that when pump 34 is operating in a forward direction, fluid will be delivered through conduit 36, flow divider 40 conduits 42 and 46 to the inlet of each motor 50. Simultaneously, fluid flow will also be directed through conduit 104. The flow of fluid through conduit 104 is in such a direction that check valve 108 tends to open. However, conduits 130 and 110 deliver fluid from the upstream side of valve 108 to the downstream side, essentially equalizing the pressure on either side of the valve, to maintain the valve in a closed position. Valve 124 is actuated to place line 128 in alignment with conduit 112 to insure pressure is maintained on the downstream side of valve 108. Valve 118 is actuated to place internal line 120 in communication with conduit 114. Thus, oil will be bled from chamber 65, oil connection fitting 69 (see FIG. 3) and through conduit 114, internal line 120 to sump 102. The foregoing relieves the oil pressure in chamber 65.

As noted previously, output shaft 80 includes sun gear 82. With motor 50 in driving engagement with shaft 80 through clutch 86, rotation of gear 82, in turn, rotates planetary gears 84, member 90, wheels 98 and tires 30 and 32. Thus, when the front wheels are attempting to rotate at a speed less than the rotational speed of motor 50, and the vehicle 10 is moving in a forward direction, the front wheels may be directly driven through operation of motor 50.

Now let us consider the operation of the vehicle in a reverse direction. In the reverse direction, rotation of wheels 30 and 32 will cause rotation of hydraulic motors 50 also in a reverse direction. The characteristic of the one-way clutch 86, when wheels 30 and 32 are rotated in a reverse direction, is such that output shaft 80 will be directly connected to main gear 56. Thus, rotation of the wheels in a reverse direction will likewise cause motors 50 to be rotated in a reverse direction. Rotation of motors 50 in a reverse direction will "pump" oil from conduits 44 and 48 to conduits 104 and 42 and 46. Valve 124 is placed in its reverse mode operating state to align internal line 126 with conduit 112. The foregoing bleeds fluid from conduits 130 and 110 to sump 102. By relieving the pressure on the downstream side of valve 108, the fluid pressure on the upstream side will cause the valve to open. With check valve 108 open, a low pressure flow path is established between conduits 44, 48 and 104. In essence, the establishment of the low pressure bypass path equalizes the pressure across motor 50, thereby unloading the motor. The motor and attached wheel turn freely under such conditions and do not affect operation of the normal vehicle drive system.

However, if it is desired to activate the front wheel drive system when the vehicle is moving in a reverse direction, the displacement of pump 34 is increased to increase the flow of fluid therefrom. Pump 34 discharges the increased flow of fluid through conduit 38 (when the pump output is reversed) which, creates a pressure on the downstream side of check valve 108 to close the check valve. Flow of fluid from charge pump 34A flows through conduit 115 to valve 118. Valve 118 is actuated so that internal line 122 is in alignment with conduits 115 and 114 thereby delivering fluid to oil connection fitting 69 which, in turn, delivers fluid into chamber 65. Although the rotational speed of motor 50 may now exceed the rotational speed of tires 30 and 32, main gear 56 will not be in driving engagement with output shaft 80 through oneway clutch 86 due to the characteristics of the clutch. As noted previously, clutch 86, when rotated in the reverse direction, engages shaft 80 to motor 50 thus necessitating check valve 108. When motor speed exceeds shaft speed, clutch 86 isolates the motor from the shaft.

However, fluid as noted previously has been delivered into piston chamber 65. The foregoing moves piston 66 to the right as viewed in FIG. 3, thereby engaging clutch 72. Main gear 56 thus drives output shaft 80 through clutch 72 when motor 50 is rotated in a reverse direction.

The utilization of the one-way clutch in combination with the friction clutch enables the front wheel drive motors 50 to drive the front wheels 30 and 32 in both the forward and reverse directions, yet, the clutches effectively disconnect or isolate the motors from the front wheel drive gears when front wheel assist drive is not required. The foregoing assures that there is no dynamic braking from the hydrostatic circuit of the front wheel assist drive.

While not shown, the output of pump 34 can be changed to engage the front wheel drive system automatically, as through means sensing a rotational speed differential and between the front wheels and rear drive wheels, or manually under control of the vehicle's operator.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. A front wheel assist drive for a vehicle having a front wheel and a rear wheel and including a rear wheel main drive comprising:
   a fluid pump;
   conduit means connected to the inlet and outlet of said pump for respectively delivering fluid to and from said pump;
   a hydraulic motor having an inlet and outlet connected through said conduit means to said pump outlet and inlet;
   an output shaft connected to said motor and operated thereby;
   an overrunning clutch interposed between said motor and said output shaft for selectively connecting said shaft to said motor when the motor is turning in a first direction;
   means connecting said output shaft to said front wheel for driving said wheel in a first direction via said motor; and
   normally closed check valve means in fluid communication with said motor inlet, said valve means being opened when said front wheel is driven in a reverse direction through the main drive to establish a flow path from said motor inlet to said outlet for preventing said motor from functioning as a pump.

2. A front wheel assist drive in accordance with claim 1, further including:
   a positive clutch interposed between said motor and said output shaft for selectively connecting said shaft to said motor when the motor is turning in a reverse direction;
   means to actuate said positive clutch; and
   means to close said check valve means when the positive clutch is actuated whereby continued operation of said motor in said reverse direction will drive the front wheel in a reverse direction.

3. A front wheel assist drive in accordance with claim 2 wherein said positive clutch is hydraulically actuated.

4. A front wheel assist drive in accordance with claims 1 or 3 wherein said vehicle is a motor grader.

5. A front wheel assist drive for a vehicle having a rear wheel main drive comprising:
   a fluid pump;
   conduit means connected to the inlet and outlet of said pump for respectively delivering fluid to and from said pump;

a hydraulic motor having an inlet and an outlet connected through said conduit means to said pump outlet and inlet, said motor having an output shaft including a gear attached thereto;

an input mesh gear in driving engagement with said motor gear;

an output shaft, including a sun gear, said shaft being connected to said input mesh gear;

an overrunning clutch interposed between said input mesh gear and said output shaft for selectively connecting said shaft through said input mesh gear to said motor when the motor is turning in a first direction;

a ring gear having internal teeth disposed concentrically about said sun gear;

a planetary gear set interposed between said sun and ring gears and being in driving engagement with said sun gear;

means in driven engagement with said planetary gear set and connected to said front wheel for driving said wheel in a first direction; and control means connected to said motor for preventing the motor from functioning as a pump when the front wheel is driven in a reverse direction through the main drive, said control means including normally close check valve means in fluid communication with said motor inlet; and a control circuit connected to said valve means to open said valve means when the wheel is driven in a reverse direction through the main drive to establish a flow path from the motor inlet to the outlet.

6. A front wheel assist drive in accordance with claim 5 further including:

a positive clutch interposed between said motor and said output shaft for selectively connecting said shaft to said motor when the motor is turning in the reverse direction;

means to actuate said positive clutch; and means to close said check valve means whereby continued operation of said motor in said reverse direction will drive the front wheel in a reverse direction through said positive clutch.

7. A front wheel assist drive in accordance with claim 6 wherein said positive clutch is hydraulically actuated.

8. A front wheel assist drive in accordance with claim 7 wherein said vehicle is a motor grader.

9. A front wheel assist drive for a vehicle having a front wheel and a rear wheel including a rear wheel main drive comprising:

a fluid pump;

conduit means connected to the inlet and outlet of said pump for respectively delivering fluid to and from said pump;

a hydraulic motor having an inlet and an outlet connected through said conduit means to said pump outlet and inlet;

an output shaft connected to said motor and operated thereby;

an overrunning clutch interposed between said motor and said output shaft for selectively connecting said shaft to said motor when the motor is turning in a first direction;

means connecting said output shaft to said front wheel for driving said wheel in a first direction via said motor; and control means connected to said motor for preventing the motor from dynamically braking the vehicle when the front wheel is driven in a reverse direction through the main drive, said control means including normally close check valve means in fluid communication with said motor inlet and a fluid control circuit operable to open said valve means when the front wheel is driven in a reverse direction through the main drive to establish a flow path from the motor inlet to the outlet for preventing the motor from functioning as a pump.

10. A front wheel assist drive for a vehicle in accordance with claim 9 further including:

a positive clutch interposed between said motor and said output shaft for selectively connecting said shaft to said motor when the motor is turning in a reverse direction;

means to actuate said positive clutch; and means to close said check valve means whereby continued operation of said motor in said reverse direction will drive the front wheel in a reverse direction.

11. A front wheel assist drive for a vehicle in accordance with claim 10 wherein said positive clutch is hydraulically actuated.

12. A method of driving the front wheels of a vehicle having a rear wheel main drive comprising the steps of:

providing a fluid motor, normally disconnected from the front wheels, to drive the front wheels when motor speed exceeds front wheel speed;

mechanically connecting the motor to the front wheels when the vehicle is traveling in a first direction and motor speed exceeds front wheel speed;

establishing a hydraulic control circuit to control the connection of the motor to the front wheels to drive the same when the vehicle is traveling in a second direction;

hydraulically overriding the mechanical connection between the motor and front wheels when the vehicle is traveling in the second direction and front wheel speed exceeds motor speed; and hydraulically actuating through said control circuit a second mechanical connection between said motor and front wheels when the vehicle is traveling in the second direction and motor speed exceeds front wheel speed.

13. A method of driving the front wheels of a vehicle having a rear wheel main drive comprising the steps of:

providing a fluid motor, normally disconnected from the front wheels, to drive the front wheels when motor speed exceeds front wheel speed;

driving the motor by delivering fluid thereto from a hydraulic pump;

mechanically connecting the motor to the front wheels when the vehicle is traveling in a first direction and motor speed exceeds front wheel speed;

establishing a hydraulic control circuit to control the connection of the motor to the front wheels to drive the same when the vehicle is traveling in the second direction;

overriding the mechanical connection between the motor and the front wheels when front wheel speed exceeds motor speed and the vehicle is traveling in the second direction; and hydraulically actuating through said control circuit a second mechanical connection between the motor and front wheels when the vehicle is traveling in the second direction and motor speed exceeds the wheel speed.

14. A method in accordance with claim 13 wherein the hydraulically actuating step includes increasing the speed of the hydraulic pump to increase the fluid output therefrom.

* * * * *